(12) United States Patent
Guo et al.

(10) Patent No.: US 7,469,766 B2
(45) Date of Patent: Dec. 30, 2008

(54) VEHICLE SEAT BELT ASSEMBLY

(75) Inventors: Derek Y. Guo, Troy, MI (US); Mark A. Morra, Clarkston, MI (US); Jeffrey A. Upchurch, Rochester, MI (US); Mark O. Ellis, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 109 days.

(21) Appl. No.: 11/690,963

(22) Filed: Mar. 26, 2007

(65) Prior Publication Data
US 2008/0238178 A1  Oct. 2, 2008

(51) Int. Cl.
B60R 21/00 (2006.01)
B60R 22/30 (2006.01)

(52) U.S. Cl. .................. 180/268; 280/806; 297/471

(58) Field of Classification Search .............. 280/801.1, 280/801.2, 806, 807, 808; 180/268, 271, 180/274; 297/470, 471, 472, 474, 477, 483, 297/485
See application file for complete search history.

(56) References Cited

U.S. PATENT DOCUMENTS

| 5,135,256 | A | | 8/1992 | Weller |
| 5,207,618 | A | | 5/1993 | Nishizawa |
| 5,718,455 | A | * | 2/1998 | Kawaguchi et al. ......... 280/805 |
| 6,213,512 | B1 | * | 4/2001 | Swann et al. ................ 280/806 |
| 6,447,001 | B1 | | 9/2002 | Hsia |
| 6,644,723 | B2 | | 11/2003 | Motozawa |
| 6,666,292 | B2 | * | 12/2003 | Takagi et al. ................ 180/274 |
| 6,899,353 | B2 | | 5/2005 | Volk |
| 2007/0046015 | A1 | * | 3/2007 | Tanaka et al. ............... 280/806 |
| 2007/0235999 | A1 | * | 10/2007 | Morra et al. ................ 280/806 |

* cited by examiner

*Primary Examiner*—Paul N. Dickson
*Assistant Examiner*—Joseph Rocca

(57) ABSTRACT

A seat belt assembly is provided for an occupant seated in a seat that includes a seat back portion and a seat base portion having an outboard side. The seat belt assembly includes a continuous seat belt having a lap belt and shoulder belt. The lap belt has an inboard portion, an outboard portion, and an anchor portion. The anchor portion is fixed to an anchor member positioned below, rearward, and inboard relative to the outboard side of the seat base portion. An actuator assembly is selectively engageable with the outboard portion of the lap belt and is operable to selectively release the lap belt. A pre-tensioner is operatively connected to the shoulder belt. The pre-tensioner is configured to tension the shoulder belt and the lap belt thereby applying force in an inboard direction when the lap belt is released from the actuator assembly.

20 Claims, 3 Drawing Sheets

VEHICLE SEAT BELT ASSEMBLY

TECHNICAL FIELD

The present invention pertains generally to a seat belt assembly for a vehicle.

BACKGROUND OF THE INVENTION

It is well known in motor vehicles to restrain a seated occupant with a seat belt assembly such as a conventional three-point seat belt. The three-point seat belt typically includes a lap belt and a shoulder belt, which reach around and thereby secure the occupant to the car seat. The seat belt assembly may also include a seat belt tensioning device or pre-tensioner, which forcibly tensions the seat belt in response to a vehicle condition such as vehicle deceleration or an impact.

SUMMARY OF THE INVENTION

A seat belt assembly for an occupant seated in a seat that includes a seat back portion and a seat base portion having an outboard side is provided. The seat belt assembly includes a continuous seat belt having a lap belt and shoulder belt. The lap belt has an inboard portion, an outboard portion, and an anchor portion. The anchor portion is fixed to an anchor member positioned below, rearward, and inboard relative to the outboard side of the base portion. An actuator assembly is selectively engageable with the outboard portion of the lap belt and is operable to selectively release the lap belt. A pre-tensioner is operatively connected to the shoulder belt and is configured to selectively tension the shoulder belt and the lap belt, thereby applying force in an inboard direction when the lap belt is released from the actuator assembly.

A control device operatively connected to the actuator assembly may be provided. The control device is preferably configured to actuate the actuator during a side impact event to release the lap belt and to prevent actuation of the actuator during a frontal impact event to retain the lap belt. An anchor pre-tensioner may be disposed between the anchor portion of the lap belt and the anchor member and is operable to selectively tension the lap belt. A buckle assembly may be mounted with respect to the inboard portion of the lap belt, while a buckle pre-tensioner may be mounted with respect to the buckle assembly and is operable to selectively tension the lap belt and the shoulder belt.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
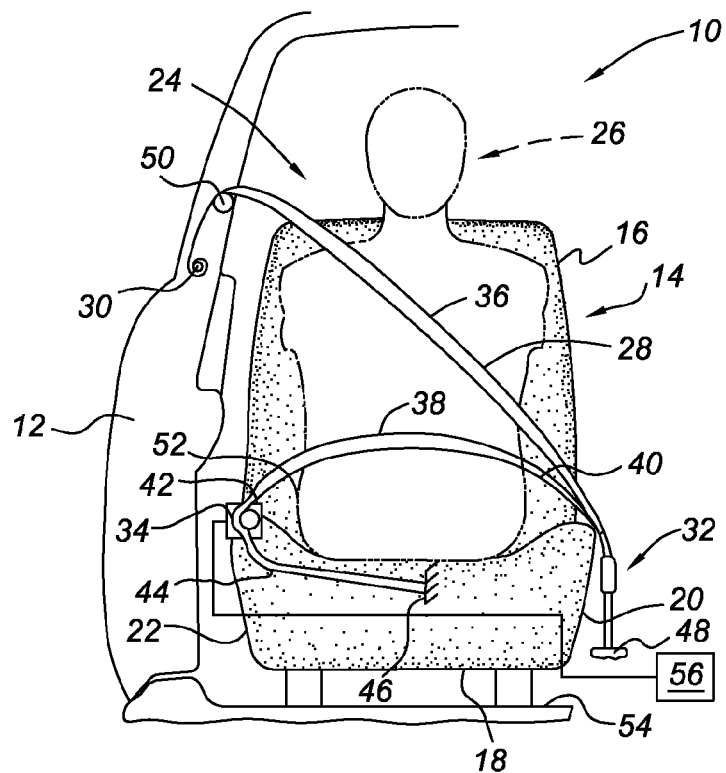
FIG. 1 is a schematic front view of a portion of a vehicle illustrating a seat belt assembly of the present invention.

Referring to the drawings, wherein like reference numbers refer to like components throughout the several figures, FIG. 1 shows a portion of a passenger vehicle 10 having a passenger side door panel 12. A seat 14 including a back portion 16 and a base portion 18 is disposed within the vehicle 10. The base portion 18 of the seat 14 includes an inboard side 20 and an outboard side 22. A seat belt assembly 24 is applied to an occupant 26 seated in the seat 14 and includes a three-point seat belt 28, a belt tensioning device or pre-tensioner 30, a buckle assembly 32 and an actuator 34 in accordance with the present invention.

The three-point seat belt 28 includes a shoulder belt 36 and a lap belt 38. The lap belt 38 includes an inboard portion 40, an outboard portion 42 and an anchor portion 44. The three-point seat belt 28 is generally continuous such that the shoulder belt 36 is connected to the inboard portion 40 of the lap belt 38. When the seat belt assembly 24 is in the applied position, as shown in FIG. 1, the lap belt 38 is defined between an outboard anchor 46 and an inboard anchor 48 to which the three-point seat belt 28 is attached with the buckle assembly 32. Similarly, when the seat belt assembly 24 is in the applied position, shown in FIG. 1, the shoulder belt 36 is defined between an outboard anchor 50 and the inboard anchor 48. The seat belt assembly 24 is shown with a three-point seat belt 28 for illustrative purposes; however, it should be appreciated that the present invention may also be applied to alternate seat belt configurations.

The anchor portion 44 of the lap belt 38 extends from the outboard anchor 46 toward the actuator 34. In the preferred embodiment, the outboard anchor 46 is positioned below, rearward, and inboard relative to the outboard side 22 of the base portion 18 and therefore an outboard hip 52 of the occupant 26. The outboard anchor 46 may be disposed with respect to the base portion 18 of the seat 14; however, those skilled in the art will recognize that the outboard anchor 46 may be mounted with respect to a floor 54 of the vehicle 10. The actuator 34 is selectively engaged with the outboard portion 42 of the lap belt 38 and operates to maintain the outboard portion 42 of the lap belt 38 with respect to the seat 14. Additionally, the actuator 34 is operable to selectively release the outboard portion 42 of the lap belt 38 in response to a signal from a control device 56. The control device 56 may be existing hardware mounted with respect to the vehicle 10 that would otherwise be implemented to deploy side airbags and/or roof rail airbags (not shown) during side impact events. The shoulder belt 36 is operatively connected to the pre-tensioner 30. The pre-tensioner 30 is configured to selectively and rapidly retract at least a portion of the shoulder belt 36, thereby tensioning the shoulder belt 36 and lap belt 38.

Figure 2:
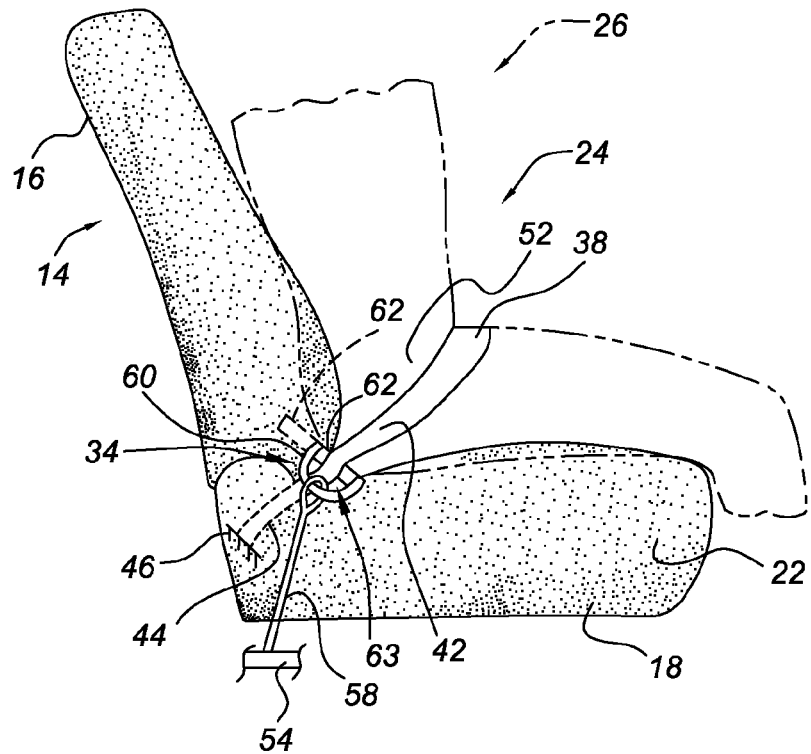
FIG. 2 is a schematic side view further illustrating aspects of the seat belt assembly of FIG. 1.

Referring to FIG. 2, and with continued reference to FIG. 1, there is shown a side view of the seat 14 further illustrating aspects of the seat belt assembly 24. As shown in FIG. 2, the actuator 34 is secured with respect to the floor 54 of the vehicle 10 via a cable 58 or other tethering device; however, alternate placement for securing the actuator mechanism 34, such as to the base portion 18 of the seat 14, may be envisioned while remaining within the scope of that which is claimed. The actuator 34 may be any device known in the art capable of selectively retaining the lab belt 38 with respect to the seat 14. As shown in FIG. 2, the actuator 34 includes a D-ring 60 having a selectively movable pin 62. The D-ring 60 and pin 62 define an opening 63 configured to slidably receive the lap belt 38 thereby enabling relative motion between the lap belt 38 and the actuator 34. The pin 62 is movable with respect to the D-ring 60, as indicated by the dashed lines, such that the pin 62 enables the selective release of the outboard portion 42 of the lap belt 38.

Having described the structure in accordance with the preferred embodiment of the present invention, its operation will now be explained with reference to FIG. 1 for a frontal impact event and FIG. 3 for a side impact event. During the frontal impact event, the actuator assembly 34 will retain the lap belt 38 with respect to the seat 14, while the pre-tensioner 30 will retract thereby pulling or tensioning the three-point seat belt 28 to substantially prevent the forward movement of the occupant 26.

Figure 3:
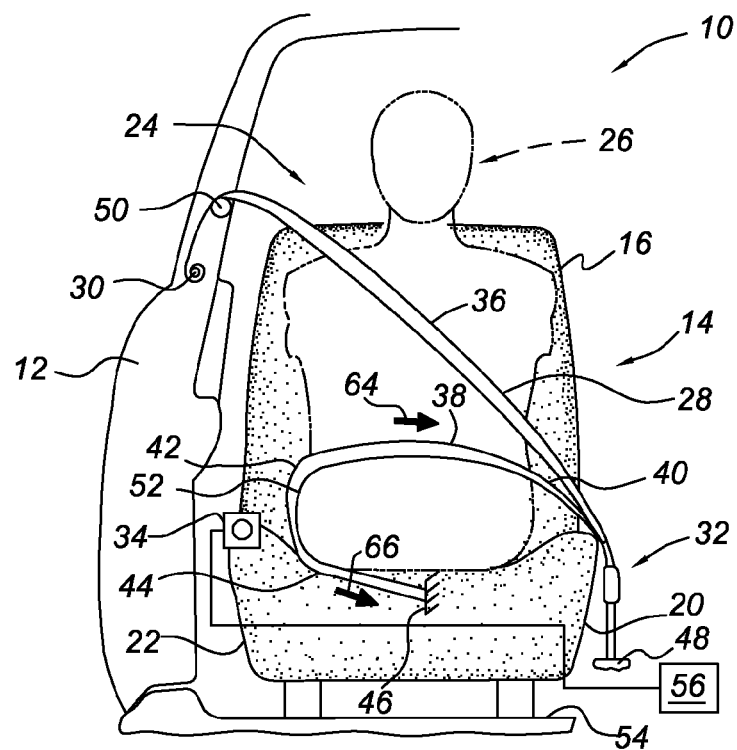
FIG. 3 is a schematic front view of the seat belt assembly of FIGS. 1 and 2 illustrating an actuated state during a side impact event.

During the side impact event, the actuator 34 is commanded to actuate by the control device 56 thereby releasing the outboard portion 42 of the lap belt 38, as shown in FIG. 3. The pre-tensioner 30 will retract thereby pulling or tensioning the three-point seat belt 28 such that the outboard portion 42 of the lap belt 38 is pulled inboard from the outboard side 22 of the base portion 18 of seat 14 and into engagement with the outboard hip 52 of the occupant 26. As the pre-tensioner 30 continues to tension the three-point seat belt 28, the occupant 26 is pulled or urged both inward, as indicated by arrow 64, toward the interior of the vehicle 10 and downward, as indicated by arrow 66, into the seat 14. Advantageously, the seat belt assembly 24 of the present invention allows the three-point seat belt 28 to bias the occupant 26 inboard and away from the door panel 12 thereby obviating the need for devices such as, for example, pelvic pusher blocks, pelvic airbags, etc. By mounting the outboard anchor 46 below and rearward relative to the outboard side 22 of the base portion 18 and the outboard hip 52 of the occupant 26, the forces acting on the occupant 26 by the lap belt 38 are directed such that the occupant 26 is biased downward and rearward into the seat 14, thereby increasing the frictional forces between the occupant 26 and the seat 14. Additionally, by mounting the outboard anchor 46 inboard relative to the outboard side 22 of the base portion 18 and the outboard hip 52 of the occupant 26, the forces acting on the occupant 26 by the lap belt 38 are directed such that the occupant 26 is biased inward toward the interior of the vehicle 10 and away from the point of impact.

Figure 4:
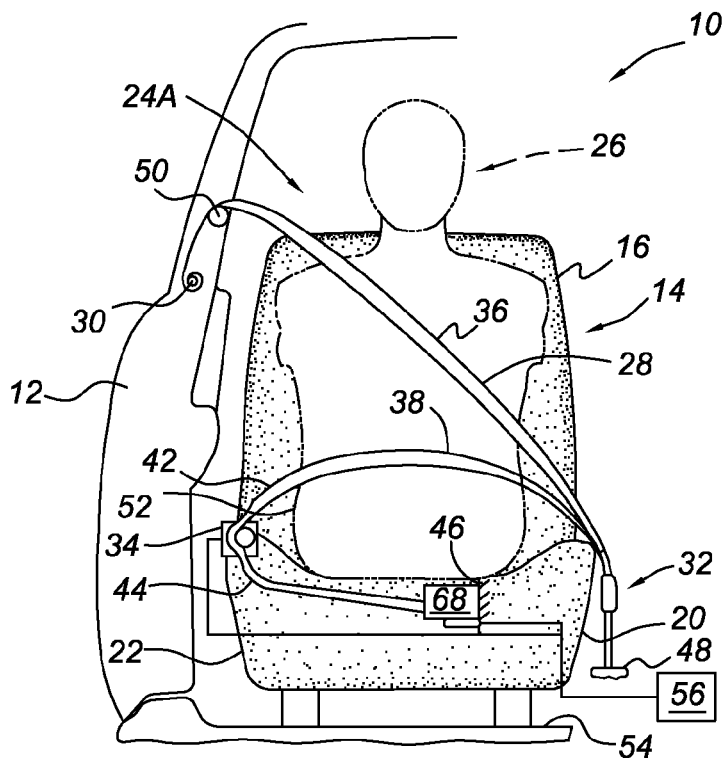
FIG. 4 is a schematic front view of a seat belt assembly in accordance with an alternate embodiment of the present invention.

Referring to FIG. 4, an alternate embodiment of the seat belt assembly 24 is shown, generally indicated at 24A. The seat belt assembly 24A includes an anchor pre-tensioner 68 preferably positioned within the base portion 18 of the seat 14 and disposed between the anchor portion 44 of the lap belt 38 and the outboard anchor 46. The anchor pre-tensioner 68 is selectively controlled by the control device 56. In operation, during a frontal impact event, the pre-tensioner 30 will operate thereby retracting at least a portion of the shoulder belt 36 to tension the three-point seat belt 28. Similarly, the anchor pre-tensioner 68 is commanded to operate by the control device 56 thereby retracting at least a portion of the anchor portion 44 of the lap belt 38 to further tension the three-point seat belt 28. As described hereinabove with reference to FIG. 1, the actuator 34 will retain the outboard portion 42 of the lap belt 38 with respect to the seat 14 during the frontal impact event.

During a side impact event, the actuator 34 is commanded to actuate by the control device 56 thereby releasing the outboard portion 42 of the lap belt 38. Simultaneously, the control device 56 commands the anchor pre-tensioner 68 to retract at least a portion of the anchor portion 44 of the lap belt 38. Additionally, the pre-tensioner 30 will retract thereby pulling or tensioning the three-point seat belt 28. As discussed above with reference to FIG. 3, the outboard portion 42 of the lap belt 38 is pulled inboard with respect to the outboard side 22 of the base portion 18 and into engagement with the outboard hip 52 of the occupant 26. As the pre-tensioners 68 and 30 continue to tension the three-point seat belt 28, the occupant 26 is pulled or urged both inward toward the interior of the vehicle 10 and downward into the seat 14. Advantageously, the seat belt assembly 24A of the present invention allows the three-point seat belt 28 to bias the occupant 26 inboard and away from the door panel 12 during the side impact event. Additionally, by including the anchor pre-tensioner 68 within the seat belt assembly 24, the "pull in" (i.e., the amount of slack within the three-point seat belt 28 to be retracted) required for the outboard portion 42 of the lap belt 38 to contact the outboard hip 52 of the occupant 26 by each of the pre-tensioners 30 and 68 is reduced. This reduction in pull-in results in reduced response time of the seat belt assembly 24. Additionally, the pre-tensioners 30 and 68 cooperate to provide simultaneous pulling of the outboard hip 52 of the occupant 26 during the side impact event.

Figure 5:
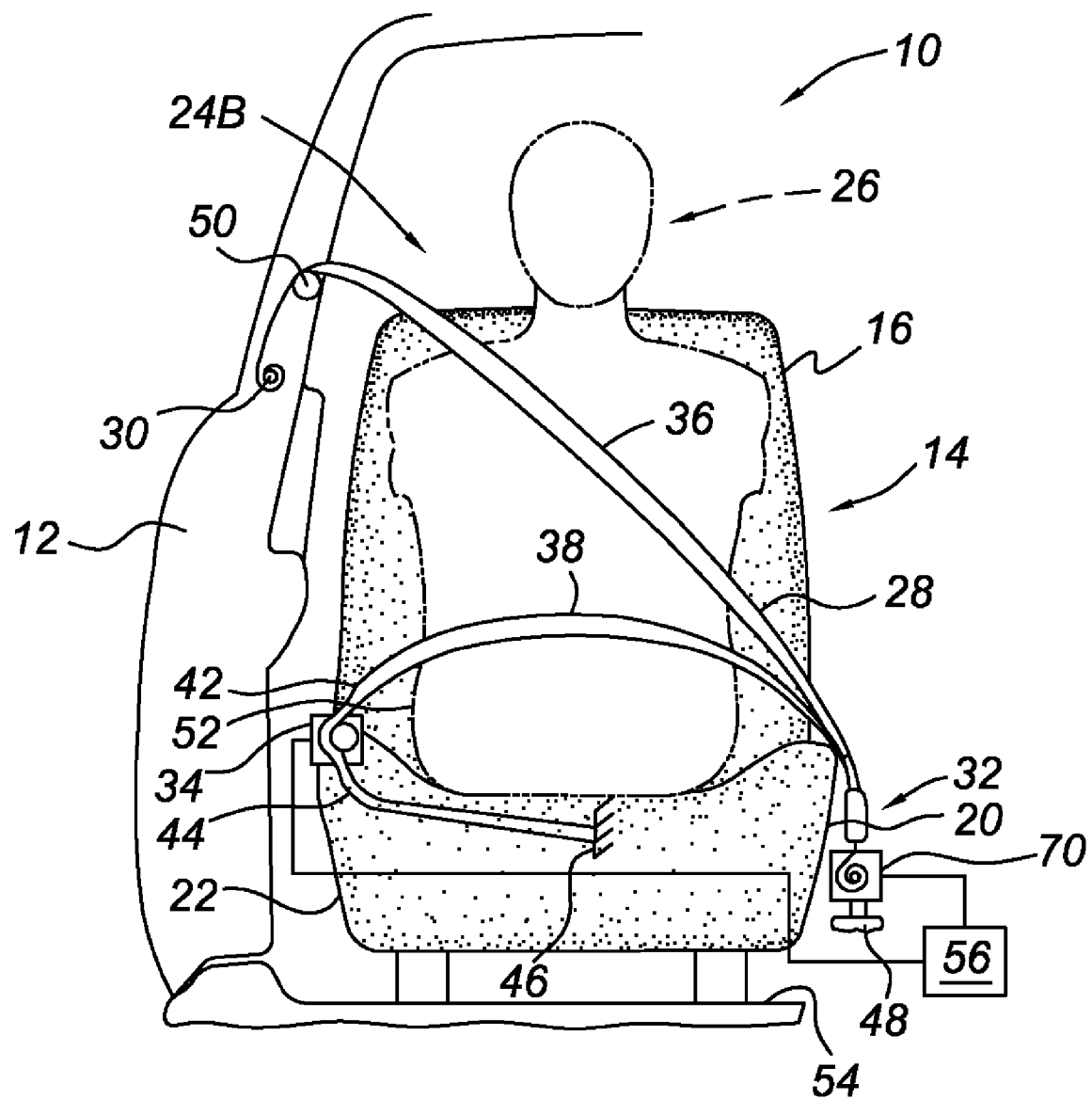
FIG. 5 is a schematic front view of a seat belt assembly in accordance with another alternate embodiment of the present invention.

Referring to FIG. 5, another alternate embodiment of the seat belt assembly 24 is shown, generally indicated at 24B. The seat belt assembly 24B includes a buckle pre-tensioner 70 positioned between the inboard anchor portion 48 and the buckle assembly 32. The buckle pre-tensioner 70 is selectively controlled by the control device 56 and is preferably commanded to operate during both frontal and side impact events.

The pre-tensioner 30, of FIGS. 1 through 5, anchor pre-tensioner 68, of FIG. 4, and the buckle pre-tensioner, of FIG. 5, may be of any type known in the art, such as those that include a pyrotechnic charge device that may be ignited to retract or tension the three-point seat belt 28. Alternately the pre-tensioner 30, anchor pre-tensioner 68, and buckle pre-tensioner 70 may include a mechanical energy storage device, such as a spring, which may be actuated to retract or tension the three-point seat belt 28 in the event of an impact event. Advantageously, a typical mechanical energy storage device is re-settable such that servicing the device after actuation is less expensive than with a pyrotechnic device which is typically deployable only once.

While the best modes for carrying out the invention have been described in detail, those familiar with the art to which this invention relates will recognize various alternative designs and embodiments for practicing the invention within the scope of the appended claims.

The invention claimed is:

1. A seat belt assembly for restraining an occupant within a seat having an outboard side, the seat belt assembly comprising:
   a lap belt defining an inboard portion, an outboard portion, and an anchor portion;
   wherein said anchor portion is fixed to an anchor member positioned inboard relative to the outboard side of the seat;
   an actuator assembly selectively engageable with said outboard portion of said lap belt and operable to selectively release said lap belt; and
   a pre-tensioner operatively connected to said inboard portion of said lap belt, said pre-tensioner being configured to selectively tension said lap belt thereby applying force in an inboard direction when said lap belt is released by said actuator assembly.

2. The seat belt assembly of claim 1, further comprising a control device operatively connected to said actuator assembly, said control device being configured to actuate said actuator assembly to effect release of said lap belt.

3. The seat belt assembly of claim 1, further comprising:
   a shoulder belt; and
   wherein said pre-tensioner is operatively connected to said lap belt through said shoulder belt.

4. The seat belt assembly of claim 1, wherein said anchor is positioned below, rearward, and inboard relative to the outboard side of the seat.

5. The seat belt assembly of claim 1, further comprising an anchor pre-tensioner disposed between said anchor portion of said lap belt and said anchor member, wherein said anchor pre-tensioner is operable to selectively tension said lap belt.

6. The seat belt assembly of claim 5, wherein said anchor pre-tensioner comprises one of a re-settable mechanical energy storage device and a pyrotechnic charge device.

7. The seat belt assembly of claim 1, further comprising:
   a buckle assembly mounted with respect to said inboard portion of said lap belt; and
   a buckle pre-tensioner mounted with respect to said buckle assembly and operable to selectively tension said lap belt.

8. The seat belt assembly of claim 6, wherein said buckle pre-tensioner comprises one of a re-settable mechanical energy storage device and a pyrotechnic charge device.

9. The seat belt assembly of claim 1, wherein said pre-tensioner comprises one of a re-settable mechanical energy storage device and a pyrotechnic charge device.

10. A seat belt assembly configured to restrain an occupant seated in a vehicle seat including a seat back portion and a seat base portion having an outboard side, the seat belt assembly comprising:
    a lap belt having an inboard portion, an outboard portion, and an anchor portion, wherein said anchor portion is fixed to an anchor member positioned inboard relative to the outboard side of the seat base portion;
    an actuator assembly selectively engageable with said outboard portion of said lap belt and operable to selectively release said lap belt;
    a shoulder belt connected to said inboard portion of said lap belt;
    a pre-tensioner operatively connected to said shoulder belt, said pre-tensioner being selectively configured to tension said shoulder belt and said lap belt thereby applying force in an inboard direction when said lap belt is released from said actuator assembly; and
    a control device operatively connected to said actuator assembly, said control device being configured to selectively actuate said actuator assembly to effect release of said lap belt.

11. The seat belt assembly of claim 10, wherein said anchor member is provided on the seat base portion of the vehicle seat.

12. The seat belt assembly of claim 10, wherein said anchor member is positioned below, rearward, and inboard relative to the outboard side of the seat base.

13. The seat belt assembly of claim 10, further comprising an anchor pre-tensioner disposed between said anchor portion of said lap belt and said anchor member, wherein said anchor pre-tensioner is operable to selectively tension said lap belt.

14. The seat belt assembly of claim 10, further comprising:
    a buckle assembly mounted with respect to said inboard portion of said lap belt; and
    a buckle pre-tensioner mounted with respect to said buckle assembly and operable to selectively tension said lap belt and said shoulder belt.

15. The seat belt assembly of claim 10, wherein said control device is sufficiently configured to actuate said actuator during a side impact event to release said lap belt and wherein said control device is sufficiently configured to prevent actuation of said actuator during a frontal impact event to retain said lap belt.

16. A seat belt assembly for an occupant seated in a seat that includes a seat back portion and a seat base portion having an outboard side, the seat belt assembly comprising:
    a continuous seat belt having a lap belt and shoulder belt;
    wherein said lap belt has an inboard portion, an outboard portion, and an anchor portion, wherein said anchor portion is fixed to an anchor member positioned below, rearward, and inboard relative to the outboard side of the seat base portion;
    an actuator assembly selectively engageable with said outboard portion of said lap belt and operable to selectively release said lap belt; and
    a pre-tensioner operatively connected to said shoulder belt, said pre-tensioner being configured to selectively tension said shoulder belt and said lap belt thereby applying force in an inboard direction when said lap belt is released from said actuator assembly.

17. The seat belt assembly of claim 16, further comprising a control device operatively connected to said actuator assembly, said control device being configured to selectively actuate said actuator assembly to effect release of said lap belt.

18. The seat belt assembly of claim 16, further comprising an anchor pre-tensioner disposed between said anchor portion of said lap belt and said anchor member, wherein said anchor pre-tensioner is operable to selectively tension said lap belt.

19. The seat belt assembly of claim 16, further comprising:
    a buckle assembly mounted with respect to said inboard portion of said lap belt; and
    a buckle pre-tensioner mounted with respect to said buckle assembly and operable to selectively tension said lap belt and said shoulder belt.

20. The seat belt assembly of claim 16, wherein said control device is sufficiently configured to actuate said actuator during a side impact event to release said lap belt and wherein said control device is sufficiently configured to prevent actuation of said actuator during a frontal impact event to retain said lap belt.

* * * * *